United States Patent [19]
Tsukagoshi et al.

[11] Patent Number: 5,870,440
[45] Date of Patent: Feb. 9, 1999

[54] DATA-LINK PROCESSING EQUIPMENT AND APPARATUS FOR SUBSCRIBER TERMINAL OFFICE USING SAME

[75] Inventors: Hirofumi Tsukagoshi; Noriyasu Matsuno, both of Kawasaki, Japan

[73] Assignee: Fujitsu Limited, Kanagawa, Japan

[21] Appl. No.: 796,124

[22] Filed: Feb. 6, 1997

[30] Foreign Application Priority Data

Apr. 3, 1996 [JP] Japan ................................ 8-081119

[51] Int. Cl.$^6$ ............................................. H04L 7/00
[52] U.S. Cl. ................................. 375/354; 370/535
[58] Field of Search .................... 370/535, 537, 370/509, 542, 512, 513, 353, 503, 350, 368, 375, 382, 520; 375/371, 362, 356, 354

[56] References Cited

U.S. PATENT DOCUMENTS 4,731,782  3/1988  Shimizu et al. ..................... 370/354
4,761,779  8/1988  Nara et al. ......................... 370/353

*Primary Examiner*—Stephen Chin
*Assistant Examiner*—Albert Park
*Attorney, Agent, or Firm*—Helfgott & Karas, PC.

[57] ABSTRACT

A data-link processing equipment which reduces the processing delay of the data-link data and performs the data-link processing with a good efficiency and an apparatus for a subscriber terminal office using this equipment. This data-link processing equipment provides a data-link synchronizing unit which establishes the synchronization of the data-link data extracted from frame synchronizing units respectively for a plurality of digital transmission lines; a data-link interface unit which latches the data-link data and outputs a data update flag; and a processor which reads and processes the latched data-link data by using the data update flag as an interrupt signal. The apparatus for a subscriber terminal office is constituted so that a subscriber data cross-connect unit is controlled by this data-link processing equipment; a cross-connection of the subscriber data is performed with phases all adjusted to be the same by a phase adjusting unit; and the subscriber data is distributed to channel units for respective subscribers.

10 Claims, 13 Drawing Sheets

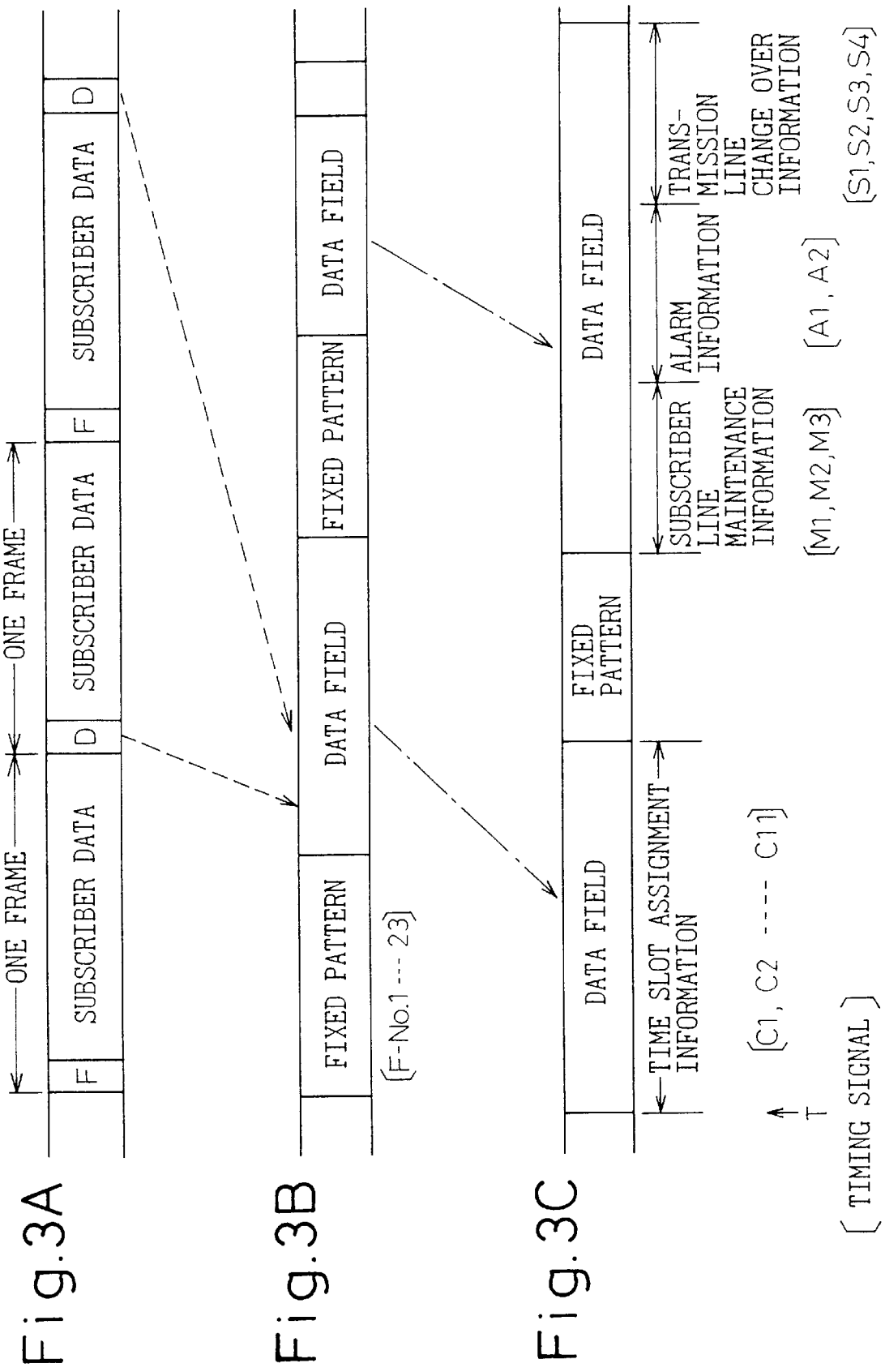

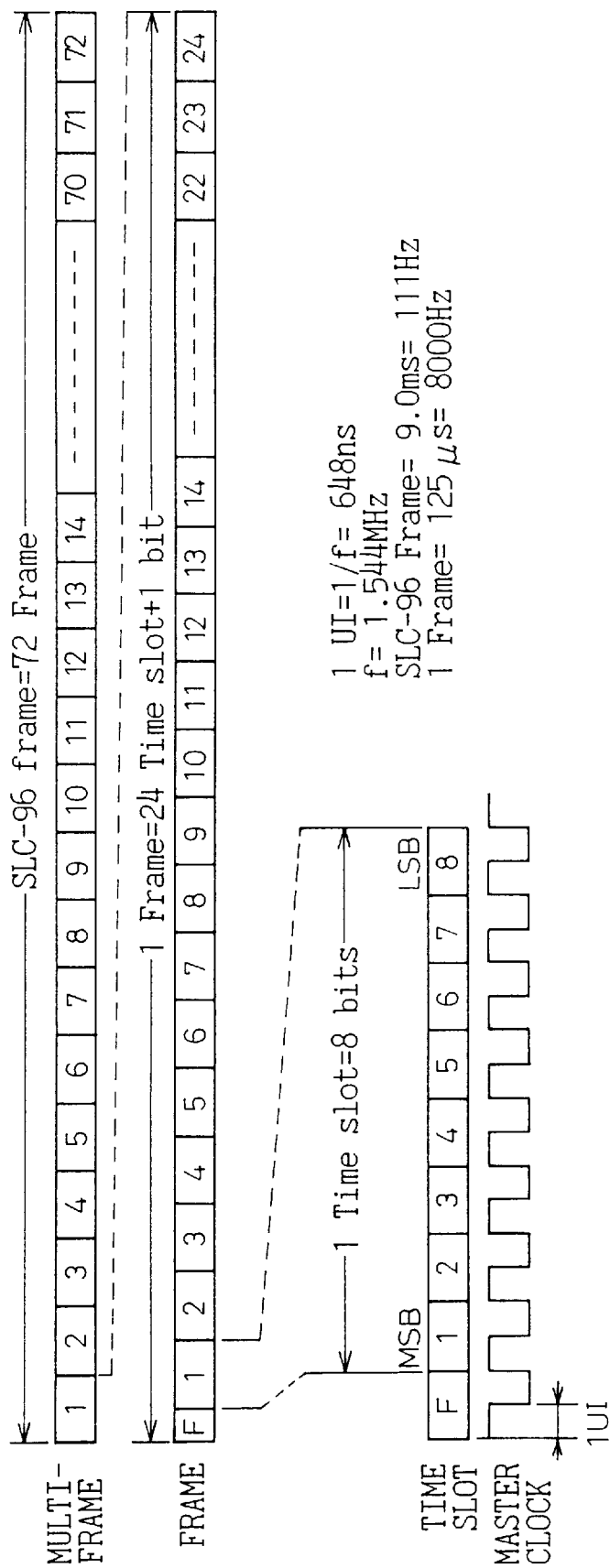

Fig. 3E

MULTIFRAME STRUCTURE

| F No. | Frame alignment signal | Multi-frame alignment signal | Bit No. in each CH Time slot | | SIG |
|---|---|---|---|---|---|
| | | | For character signal | For signaling | |
| 1 | 1 | — | 1—8 | — | |
| 2 | — | 0 | 1—8 | — | |
| 3 | 0 | — | 1—8 | — | |
| 4 | — | 0 | 1—8 | — | |
| 5 | 1 | — | 1—8 | — | |
| 6 | — | 1 | 1—7 | 8 | A |
| 7 | 0 | — | 1—8 | — | |
| 8 | — | 1 | 1—8 | — | |
| 9 | 1 | — | 1—8 | — | |
| 10 | — | 1 | 1—8 | — | |
| 11 | 0 | — | 1—8 | — | |
| 12 | — | 0 | 1—7 | 8 | B |
| 13 | 1 | — | 1—8 | — | |
| 14 | — | 0 | 1—8 | — | |
| 15 | 0 | — | 1—8 | — | |
| 16 | — | 0 | 1—8 | — | |
| 17 | 1 | — | 1—8 | — | |
| 18 | — | 1 | 1—7 | 8 | A |
| 19 | 0 | — | 1—8 | — | |
| 20 | — | 1 | 1—8 | — | |
| 21 | 1 | — | 1—8 | — | |
| 22 | — | 1 | 1—8 | — | |
| 23 | 0 | — | 1—8 | — | |
| 24 | — | C1 | 1—7 | 8 | B |
| 25 | 1 | — | 1—8 | — | |
| 26 | — | C2 | 1—8 | — | |
| 27 | 0 | — | 1—8 | — | |
| 28 | — | C3 | 1—8 | — | |
| 29 | 1 | — | 1—8 | — | |
| 30 | — | C4 | 1—7 | 8 | A |
| 31 | 0 | — | 1—8 | — | |
| 32 | — | C5 | 1—8 | — | |
| 33 | 1 | — | 1—8 | — | |
| 34 | — | C6 | 1—8 | — | |
| 35 | 0 | — | 1—8 | — | |
| 36 | — | C7 | 1—7 | 8 | B |

Fig.3F

| F No. | Frame alignment signal | Multi-frame alignment signal | Bit No. in each CH Time slot | | SIG |
|---|---|---|---|---|---|
| | | | For character signal | For signaling | |
| 37 | 1 | — | 1—8 | — | |
| 38 | — | C 8 | 1—8 | — | |
| 39 | 0 | — | 1—8 | — | |
| 40 | — | C 9 | 1—8 | — | |
| 41 | 1 | — | 1—8 | — | |
| 42 | — | C 10 | 1—7 | 8 | A |
| 43 | 0 | — | 1—8 | — | |
| 44 | — | C 11 | 1—8 | — | |
| 45 | 1 | — | 1—8 | — | |
| 46 | — | 0 | 1—8 | — | |
| 47 | 0 | — | 1—8 | — | |
| 48 | — | 1 | 1—7 | 8 | B |
| 49 | 1 | — | 1—8 | — | |
| 50 | — | 0 | 1—8 | — | |
| 51 | 0 | — | 1—8 | — | |
| 52 | — | M 1 | 1—8 | — | |
| 53 | 1 | — | 1—8 | — | |
| 54 | — | M 2 | 1—7 | 8 | A |
| 55 | 0 | — | 1—8 | — | |
| 56 | — | M 3 | 1—8 | — | |
| 57 | 1 | — | 1—8 | — | |
| 58 | — | A 1 | 1—8 | — | |
| 59 | 0 | — | 1—8 | — | |
| 60 | — | A 2 | 1—7 | 8 | B |
| 61 | 1 | — | 1—8 | — | |
| 62 | — | S 1 | 1—8 | — | |
| 63 | 0 | — | 1—8 | — | |
| 64 | — | S 2 | 1—8 | — | |
| 65 | 1 | — | 1—8 | — | |
| 66 | — | S 3 | 1—7 | 8 | A |
| 67 | 0 | — | 1—8 | — | |
| 68 | — | S 4 | 1—8 | — | |
| 69 | 1 | — | 1—8 | — | |
| 70 | — | 1 | 1—8 | — | |
| 71 | 0 | — | 1—8 | — | |
| 72 | — | 0 | 1—7 | 8 | B |

DATA-LINK PROCESSING EQUIPMENT AND APPARATUS FOR SUBSCRIBER TERMINAL OFFICE USING SAME

BACKGROUND OF THE INVENTION

1. Field of the Invention

The present invention relates to data-link processing equipment connected to a plurality of digital transmission lines and an apparatus for a subscriber terminal office using this processing equipment.

In the apparatus for a subscriber terminal office, it is necessary to expand the scale of the equipment or to install a large capacity equipment in accordance with the demands to increase the number of the subscribers which is to be accommodated. The amount of processing of the data link for transmitting and receiving the control data is also increased along with this. Accordingly, it has become necessary to make the data-link processing more efficient.

2. Description of the Related Art

As will be explained later in detail with reference to the drawings, in the apparatus for a subscriber terminal office of ordinary subscribers, for example, 96 subscribers are regarded as one control unit. At the level of DS1 signal, four transmission lines or two transmission lines are allocated for each above control unit. In this case, the number of the subscribers accommodated in a conventional apparatus for a subscriber terminal office is on the order of 96 or 192. Accordingly, the number of the data links becomes four or two, and it is possible to individually process the data links.

However, if the capacity of the apparatus for the subscriber terminal office is made larger and the number of the accommodated subscribers is increased a few times to 10 times the number of the subscribers mentioned before, the data links to be processed would be greatly increased. Accordingly, if the processing of the data links is achieved individually, it would lead to an enlargement of the scale of the apparatus and thereby a configuration of the apparatus would result in a low efficiency.

Therefore, a configuration for commonly processing a large number of data links can be considered by a person skilled in the art. In this case, consideration may be given to a configuration in which phase adjustment is performed so that the same frame synchronization timing is established with respect to the transmission lines and then the data link data is demultiplexed to process the data-link data by a commonly provided processor. However, the delay times of the transmission lines differ, and so the timing of the frame synchronization at each transmission line is different. For this reason, when matching the timings of the frame synchronizations, there may exist a transmission line which requires very long phase adjustment time. In such a case, the transmission lines must be aligned to the transmission line having the longest delay time, so there arises a problem of an increase of the processing delay of the data-link data.

SUMMARY OF THE INVENTION

Therefore, an object of the present invention is to provide the apparatus for a subscriber terminal office by which the processing delay of the data-link data is reduced and data-link processing with a good efficiency is performed, and thereby becomes economical.

To attain the above object, the present invention provides data-link processing equipment provided with (i) a data-link synchronizing unit which establishes the synchronization of the data-link data extracted from frame synchronizing units respectively for a plurality of digital transmission lines; (ii) a data-link interface unit which latches the data-link data and outputs a data update flag; and (iii) a processor which reads and processes the latched data-link data by using the data update flag as an interrupt signal. By this data-link processing equipment, the subscriber data cross-connect unit is controlled, a cross-connection of the subscriber data is performed with phases all adjusted to be the same by the phase adjusting unit, and the subscriber data is distributed to channel units CH1 to CHk for the respective subscribers.

BRIEF DESCRIPTION OF THE DRAWINGS

The above object and features of the present invention will be more apparent from the following description of the preferred embodiments with reference to the accompanying drawings, wherein:

FIGS. 3A, 3B, 3C, 3D, 3E, and 3F are explanatory views of the data format;

DESCRIPTION OF THE PREFERRED EMBODIMENTS

Before describing the embodiments of the present invention, the related art and the disadvantages therein will be described with reference to the related figures.

Figure 10:
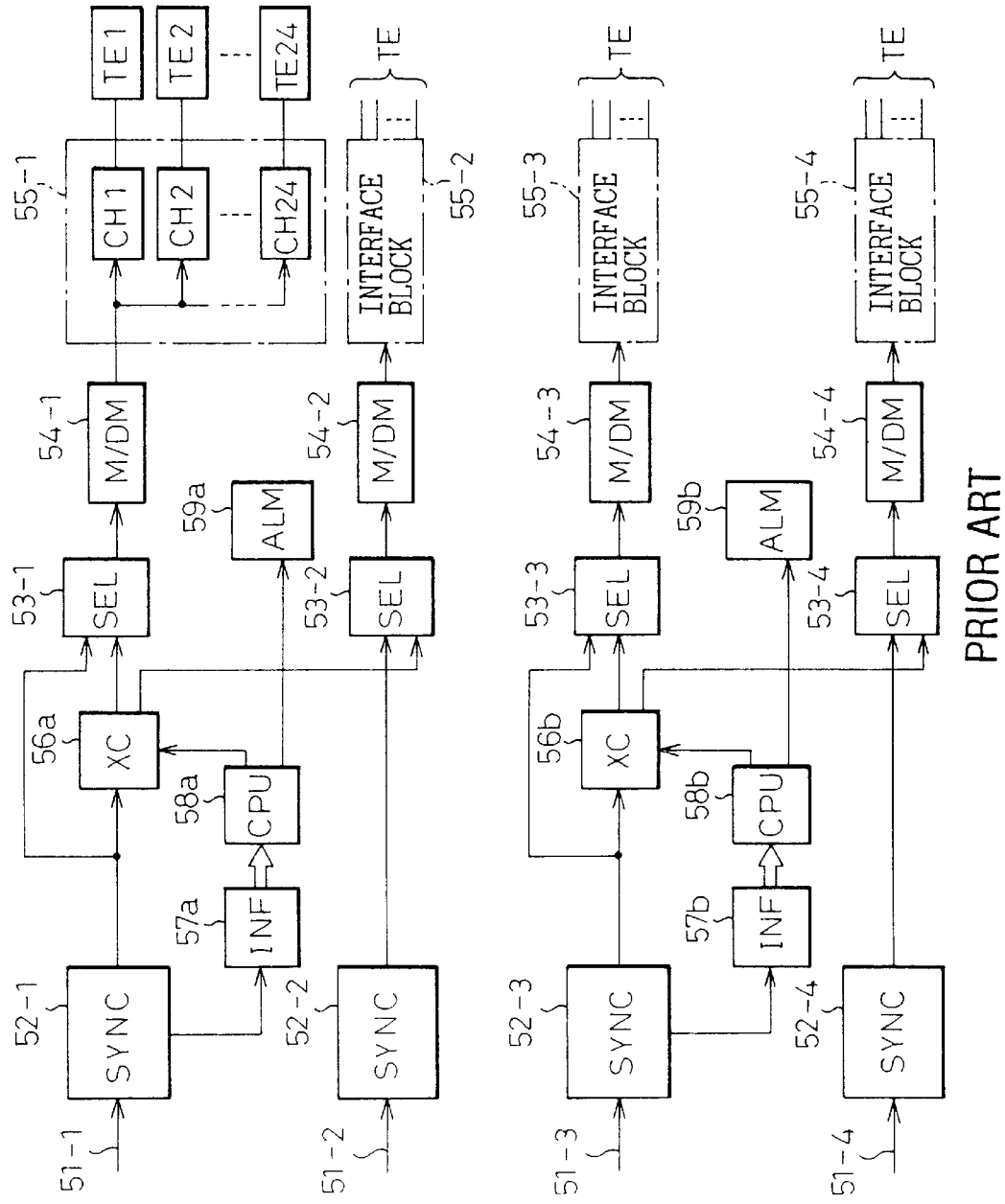
FIG. 10 is an explanatory view of a conventional apparatus for a subscriber terminal office.

FIG. 10 is an explanatory view of conventional apparatus for a subscriber terminal office, in which 51-1 to 51-4 are transmission lines for transmitting DS1 (digital signal level 1) signals of for example 1.544 Mbps, 52-1 to 52-4 are frame synchronizing units, 53-1 to 53-4 are selectors, 54-1 to 54-4 are multiplex/demultiplex units (M/DM), 55-1 to 55-4 are subscriber interface blocks, 56a and 56b are subscriber data cross-connect units (XC), 57a and 57b are data-link interface units, 58a and 58b are processors, 59a and 59b are alarm interface units, and CH1 to CH24 are channel units.

The subscriber interface blocks 55-1 to 55-4 respectively have channel units CH1 to CH24, a plurality sets of subscriber data demultiplexed into bands of 64 kbps by the multiplex/demultiplex units 54-1 to 54-4 are input to the channel units CH1 to CH24, respectively, and the subscriber data are transferred from the channel units CH1 to CH24 to the subscriber terminal equipment (TE).

For example, in an apparatus for a subscriber terminal office accommodating 96 subscribers, as mentioned before, four subscriber interface blocks 55-1 to 55-4 respectively having 24 channel units CH1 to CH24 are provided. At this time, where four transmission lines 51-1 to 51-4 are used, the selectors 53-1 to 53-4 are controlled so as to directly connect the frame synchronizing units 52-1 to 52-4 and the corresponding multiplex/demultiplex units 54-1 to 54-4.

Further, the multiplex/demultiplex units 54-1 to 54-4 demultiplex the subscriber data for respective channel units CH1 to CH24 of the subscriber interface blocks 55-1 to 55-4 and transfer them to respective subscriber terminal equipment (TE) such as telephone sets. Further, the subscriber data from subscriber terminal equipment such as telephone sets are multiplexed by a not illustrated route and transferred to the apparatus for the subscriber terminal office in which the opposing subscriber terminal equipment is accommodated.

If the efficiency of utilization of each of the transmission lines 51-1 to 51-4 is 50 percent or less, greater economy can be achieved by improving the efficiency of utilization of the transmission lines by reducing the two transmission lines 51-1 and 51-2 to one transmission line, for example, 51-1, and similarly reducing the two transmission lines 51-3 and 51-4 to one transmission line, for example, 51-3. In this case, the selectors 53-1 to 53-4 are controlled so as to connect the subscriber data cross-connect units 56a and 56b and the multiplex/demultiplex units 54-1 to 54-4.

Further, the frame synchronizing units 52-1 and 52-3 establish the frame synchronization of the data transferred via the transmission lines 51-1 and 51-3, demultiplex the data-link data, and transfer the demultiplexed data-link data to the data-link interface units 57a and 57b. Further, in the data-link interface units 57a and 57b, serial/parallel conversion is performed, and the resultant data are transferred to the processors 58a and 58b. The processors 58a and 58b control the subscriber data cross-connect units 56a and 56b according to the time slot assignment information contained in the data-link data and distribute the subscriber data transmitted via the transmission line 51-1 to the multiplex/demultiplex units 54-1 and 54-2. Further, each subscriber data transmitted via the transmission line 51-3 is distributed to respective multiplex/demultiplex units 54-3 and 54-4, and the multiplex/demultiplex units 54-1 to 54-4 demultiplex the subscriber data in correspondence with the channel units CH1 to CH24 in each of the subscriber interface blocks 55-1 to 55-4.

Accordingly, if the efficiency of utilization of each transmission line is high, four transmission lines 51-1 to 51-4 are used, and if the efficiency of utilization of each transmission line is low, for example, half or two transmission lines 51-1 and 51-3 among the four transmission lines 51-1 to 51-4 are used. By this, the effective utilization of the transmission lines can be achieved. Further, by controlling the selectors 53-1 to 53-4, it is possible to switch to the function corresponding to the number of the used lines among the transmission lines. Further, in the case of an increase in the number of the subscribers accommodated by the apparatus for the subscriber terminal office, the equipment is expanded in units of each configuration of the apparatuses corresponding to two transmission lines and each selector is controlled in accordance with whether one transmission line is used or two transmission lines are used.

As initially mentioned, in the apparatus for a subscriber terminal office of ordinary subscribers, for example, 96 subscribers are regarded as one control unit. At the level of DS1 signal, four transmission lines or two transmission lines are allocated for each above control unit. In this case, the number of the subscribers accommodated in the conventional apparatus for a subscriber terminal office is on the order of 96 or 192. Accordingly, the number of the data links becomes four or two, and it is possible to individually process the data links.

However, if the capacity of the apparatus for the subscriber terminal office is made larger and the number of the accommodated subscribers is increased a few times to 10 times the number of the subscribers mentioned before, the data links to be processed would be greatly increased. Accordingly, if the processing of the data links is achieved individually, it would lead to an enlargement of the scale of the apparatus and thereby a configuration of the apparatus would result in a low efficiency.

In order to solve this problem, persons skilled in the art may consider a configuration for commonly processing a large number of data links. In this case, consideration may be given to a configuration in which phase adjustment is performed so that the same frame synchronization timing is established with respect to the transmission lines and then the data link data is demultiplexed to process the data-link data by a commonly provided processor. However, the delay times of the transmission lines differ, and so the timing of the frame synchronization at each transmission line is different. For this reason, when matching the timings of the frame synchronizations, there may exist a transmission line which requires very long phase adjustment time. In such a case, the transmission lines must be aligned to the transmission line having the longest delay time, so there arises the above-mentioned problem of an increase of the processing delay of the data-link data.

Therefore, according to the present invention, provision is made of the apparatus for a subscriber terminal office by which the processing delay of the data-link data is reduced and data-link processing with a good efficiency is performed, and thereby becomes economical.

The invention includes the following seven aspects. Note that, the reference numerals in parentheses given here are used in the drawings referred to later.

First aspect

The data-link processing equipment of the present invention is provided with data-link synchronizing units (1-1 to 1-m), for respective digital transmission lines (5-1 to 5-m), which receive as their inputs the data-link data extracted from the digital transmission lines (5-1 to 5-m) and establish synchronization; a data-link interface device (2) which latches the data-link data synchronized by these data-link synchronizing units (1-1 to 1-m) and outputs a data update flag; and a processor (3) which starts the processing by using the data update flag as an interrupt signal and reads and processes the data-link data latched in the data-link interface device (2) by this interrupt signal. Accordingly, the data-link data can be read and processed by the processor 3 common to the digital transmission lines (5-1 to 5-m), and the processing can be performed economically and while reducing the processing delay.

Second aspect

The data-link interface device (2) is provided with a serial/parallel conversion unit (21, 31) which converts each data-link data from the data-link synchronizing unit to parallel data; a data latch unit (22, 32) which latches each parallel data converted by this serial/parallel conversion unit (21, 31); a data output gate (23, 33) which outputs the data latched in this data latch unit (22, 32); a flip-flop (25, 35) which outputs a data update flag (FLG) indicating that the data is latched in this data latch unit (22, 32); and an address decoder (24, 34) which decodes the address signal from the processor (3) for reading the data latched in the data latch unit (22, 32), controls the data output gate (23, 33), and resets the flip-flop (25, 35).

Third aspect

The above equipment can be provided with a data decoder (26) which logically processes the data latched in the data latch unit (22, 32) and a plurality of flip-flops (25) which produce the data update flags having different interrupt levels by the result of the logical processing.

Fourth aspect

The equipment may further include synchronization detecting units (38-1 to 38-4) which detect that a predetermined number of sets of data having predetermined cycles are latched in correspondence with respective sets of information which are latched in the data latch unit (32) and have plural types of updating cycles and shift registers (37-1 to 37-4) which collect by the predetermined cycles each information from the data latch unit and store the same.

Fifth aspect

The equipment of the fourth aspect may further generate a data update flag only when there is a change between the information latched with a certain updating cycle and the information latched with the next updating cycle.

Sixth aspect

The apparatus for the subscriber terminal office of the present invention may be provided with frame synchronizing units (6-1 to 6-m) for respective digital transmission lines; a phase adjusting unit (7) which receives as its input subscriber data for which the frame synchronization is established by these frame synchronizing units (6-1 to 6-m) and adjusts the phases to be the same as each other; a subscriber data cross-connect unit (8) which receives as its input each subscriber data with the phases adjusted to be the same by this phase adjusting unit (7) and performs a cross-connection; demultiplexer units (9-1) to (9-n) which demultiplex the multiplexed signal from this subscriber data cross-connect unit (8) and input the demultiplexed signals to respective channel units CH1 to CHk in the subscriber interface blocks (11-1 to 11-n); and data-link processing equipment (10) which receives as its input the data-link data demultiplexed by the frame synchronizing units (6-1 to 6-m) and processes the same to control the subscriber data cross-connect unit (8).

Seventh aspect

The data-link processing equipment (10) may be provided with data-link synchronizing units (1-1 to 1-m) which establish the data-link synchronization for the data-link data demultiplexed by the frame synchronizing units (6-1 to 6-m), a data-link interface device (2) which latches the data-link data synchronized by these data-link synchronizing units (1-1 to 1-m) and produces a data update flag; and a processor (3) which reads and processes the latched data-link data by using this flag as an interrupt signal.

Figure 1:
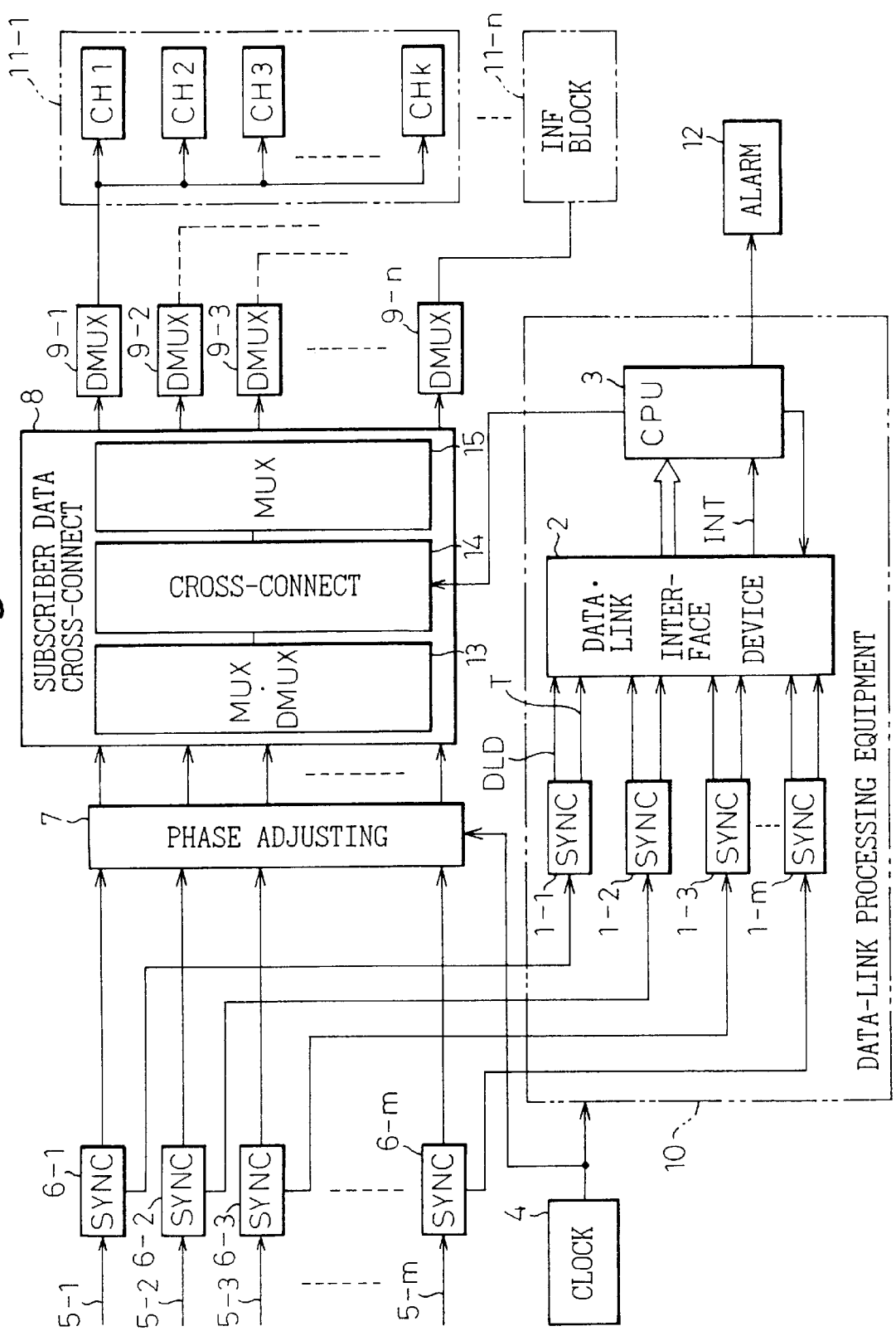
FIG. 1 is an explanatory view of a fundamental configuration of the present invention.

FIG. 1 is an explanatory view of a fundamental configuration of the present invention, in which 1-1 to 1-m are data-link synchronizing units, 2 a data-link interface device, 3 a processor (CPU) for processing the data-link data, 4 a master clock generator, 5-1 to 5-m are digital transmission lines for transmitting DS1 (digital signal level 1) signals of for example 1.544 Mbps, 6-1 to 6-m are frame synchronizing units, 7 a phase adjusting unit, 8 a subscriber data cross-connect unit, 9-1 to 9-n are subscriber data demultiplexer units, 10 data-link processing equipment, 11-1 to 11-n are subscriber interface blocks, 12 an alarm interface unit, 13 a multiplex/demultiplex unit, 14 a cross-connect unit, and 15 a multiplexer unit.

The frame synchronizing units 6-1 to 6-m establish the frame synchronization for respective transmission lines 5-1 to 5-m, demultiplex the data-link data, and transfer this demultiplexed data to the data-link synchronizing units 1-1 to 1-m in the data-link processing equipment 10. Further, the phase adjusting unit 7 inputs the transmission data to the subscriber data cross-connect unit 8 to synchronize in phase with the master clock signal from the master clock generator 4 while adjusting the phases of the transmission lines 5-1 to 5-m to become the same frame phase.

The subscriber data cross-connect unit 8 includes the multiplex/demultiplex unit 13,, the cross-connect unit 14, and the multiplexer unit 15. The cross-connect unit 14 performs a cross-connection of the subscriber data by TDM switching similar to that of the TDM exchange, cross-connects the subscriber data demultiplexed by the multiplex/demultiplex unit 13 according to the control information from the data-link processing equipment 10. The multiplexer unit 15 multiplexes the crossconnected data for respective subscriber data demultiplexer units 9-1 to 9-n. The subscriber data demultiplexer units 9-1 to 9-n demultiplex the transmission data for respective channel units CH1 to CHk in each of the subscriber interface blocks 11-1 to 11-n. k can be for example 192.

Further, the data-link processing equipment 10 establishes the synchronization for the data-link data demultiplexed by the frame synchronizing units 6-1 to 6-m by the data-link synchronizing units 1-1 to 1-m, inputs the data-link data DLD and the timing signal T to the data-link interface device 2, and inputs the data-link data DLD to the processor 3 via this data-link interface device 2.

This data-link interface device 2 has a configuration for performing the serial/parallel conversion of the data-link data, latch, interruption (INT) to the processor 3 and the transmission of the latched data responding to the request from the processor 3, and independently establishes the synchronization of the data-link for respective transmission lines 5-1 to 5-m. Accordingly, the data-link data can be processed without receiving the delay for the phase adjustment in the phase adjusting unit 7, and then a plurality of data-link can be commonly processed by a single processor 3. Further, the processor 3 transmits the alarm information to the alarm interface unit 12 when the data-link data indicates the alarm information, controls the subscriber data cross-connect unit 8 according to the time slot assignment information of the data-link data, and performs the dynamic cross-connect control of the subscriber data.

Figure 2:
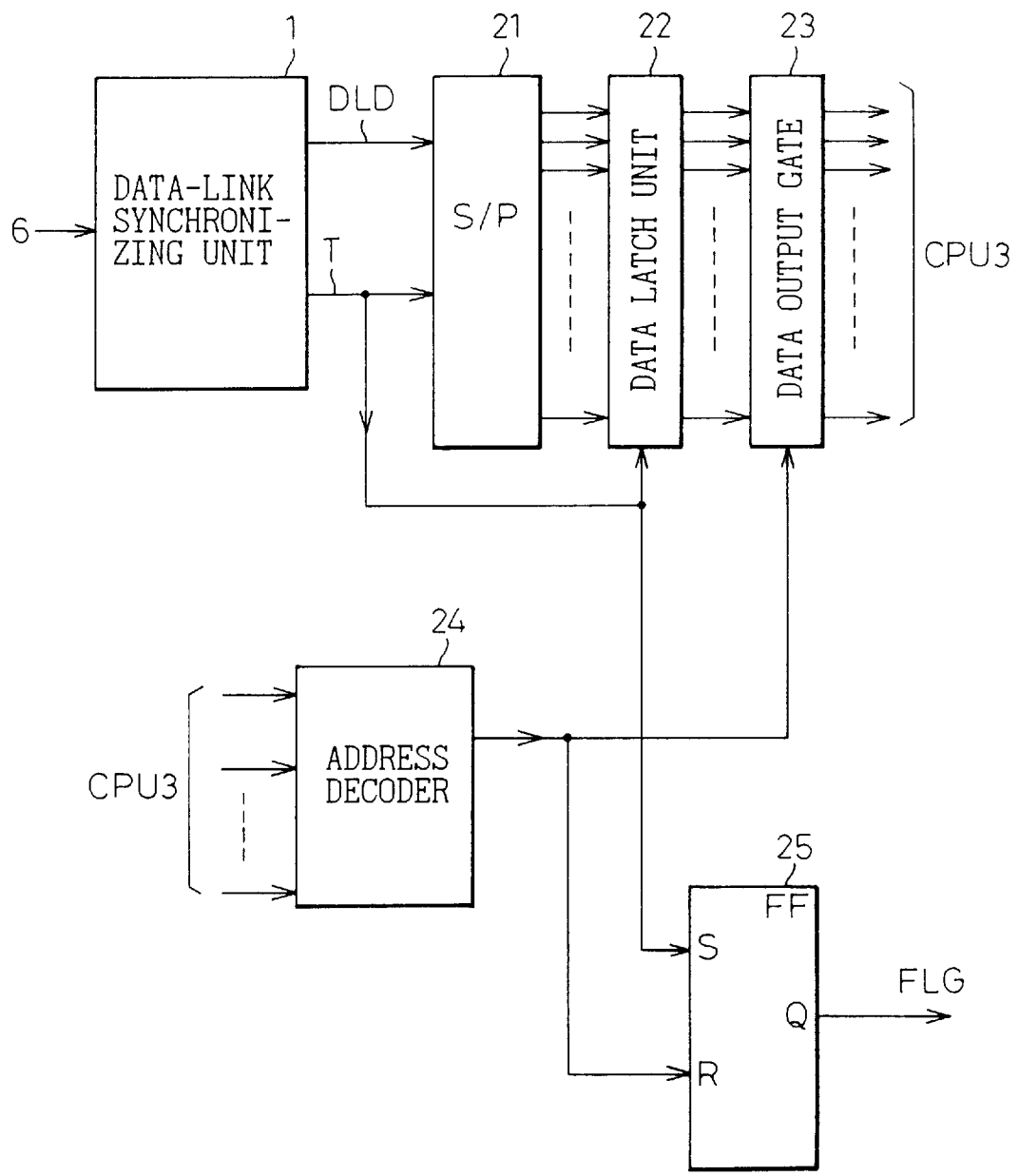
FIG. 2 is an explanatory view of a data-link interface device of a first embodiment of the present invention.

FIG. 2 is an explanatory view of the data-link interface device of the first embodiment of the present invention, in which 1 denotes a data-link synchronizing unit, 21 a serial/parallel conversion unit (S/P), 22 a data latch unit, 23 a data output gate, 24 an address decoder, 25 a flip-flop, FLG a data update flag for indicating that the data-link data is updated, DLD a data-link data, T a timing signal, and CPU a processor. Note that, the configuration of the present figure is provided corresponding to each of the frame synchronizing units 6-1 to 6-m of FIG. 1. Here, one among them is shown as a representative.

The processor 3 (CPU) and the data-link interface device 2 (refer to FIG. 1) are connected via the bus. In FIG. 2, the data output gate 23 is connected to the processor CPU by the bus, and the address decoder 24 is connected to the processor CPU by the bus.

The data-link data demultiplexed in the frame synchronizing units 6-1 to 6-m are input to the data-link synchronizing unit 1, where the synchronization of the data-link is established. By this, the data-link data DLD and the timing signal T are input to the serial/parallel conversion unit 21 and converted to parallel data. Further, the converted data is applied to the data latch unit 22 and latched by the timing signal T indicating one cycle of the data-link data. Further, the flip-flop 25 is set by this timing signal T, and the data update flag FLG of logic "1" indicating that the data-link data is latched in the data latch unit 22, is applied to the processor CPU as an interrupt signal (INT).

The processor CPU transmits the address signal for designating the data output gate 23 in response to the interrupt signal. By the decoded output signal from the address decoder 24 receiving this address signal, the data output gate 23 is opened and the data-link data latched in the data latch unit 22 are transmitted to the processor CPU. Simultaneously, the flip-flop 25 is reset by the decoded output signal. By this reset, the processor CPU will not repeatedly read the same data-link data from the data latch unit 22. Further, with respect to the transmission line which is not busy, the data update flag FLG is not set, so the processor CPU in the data-link processing equipment common to the plurality of transmission lines can process the data-link data without setting of the use or nonuse of each transmission line each time.

FIGS. 3A, 3B, 3C, 3D, 3E, and 3F are explanatory views of the data format, in which FIG. 3A shows the format of the DS1 signal; FIG. 3B shows the format of the data-link data; and FIG. 3C shows an example of contents of the data field of the data-link data. The frame synchronizing units 6-1 to 6-m (refer to FIG. 1) detect the frame synchronization bit F of the head of the subscriber data and the data-link data D, establish the frame synchronization, separate the data-link data D and input the separated data to the data-link synchronizing units 1-1 to 1-m. For these frame synchronization bit F and data-link data D, various patterns which have been already known can be used (refer to FIGS. 3E and 3F).

Further, the data-link data contains the fixed pattern and the data field as shown in FIG. 3B, and the data field contains the time slot assignment information or the alarm information, the subscriber line maintenance information, and the transmission line switching information, etc. as shown in for example FIG. 3C. The data-link synchronizing unit 1 (refer to FIG. 2) establishes the synchronization for the data-link data and can input the data-link data to the serial/parallel conversion unit 21 such that only the data field except for the fixed pattern is latched in the data latch unit 22. Further, the processor 3 in the data-link processing equipment 10 discriminates for example the time slot assignment information, controls the subscriber data cross-connect unit 8, and performs a switching of the time slots so that the subscriber data transmitted via the transmission lines 5-1 to 5-m can be distributed to the channel units CH1 to CHk in the designated subscriber interface blocks 11-1 to 11-n.

FIG. 3D shows the formats of a multi frame, frame, time slot, and mask clock in order from the topmost row. In the example of this FIG. 3D, one time slot (TS) is comprised by 8 bits, and one frame is composed of 24 TS's+frame bit (F) of 1 bit, i.e., 193 bits in total. In the "SLC-96" type of the present example, the "SLC-96" frame is composed by 72 frames. The multi-frame shown in FIG. 3D corresponds to the format of FIG. 3A.

FIGS. 3E and 3F illustrate the formats shown in FIG. 3B and FIG. 3C in further detail ("SLC-96" type). FIG. 3F is continued to FIG. 3E. These FIGS. 3E and 3F comprise the data-link data. To the frame (F No.), No. 1 to No. 72 are attached. Frame bits (F) of the frames or data bits (D) (refer to FIG. 3A) are collected to obtain data having a certain meaning.

In FIG. 3E, F-No. 1 to F-No. 23 are fixed patterns (synchronization patterns). F-No. 24 to F-No. 44 shown in FIGS. 3E and 3F represent data C1, C2 . . . C11 and are shown in FIGS. 3B and 3C as well. M1, M2 and M3 shown in FIG. 3F represent the subscriber line maintenance information, A1 and A2 represent the alarm information, and S1 to S4 represent the transmission line switching information at an occurrence of a fault. All of them are shown in FIG. 3C.

Figure 4:
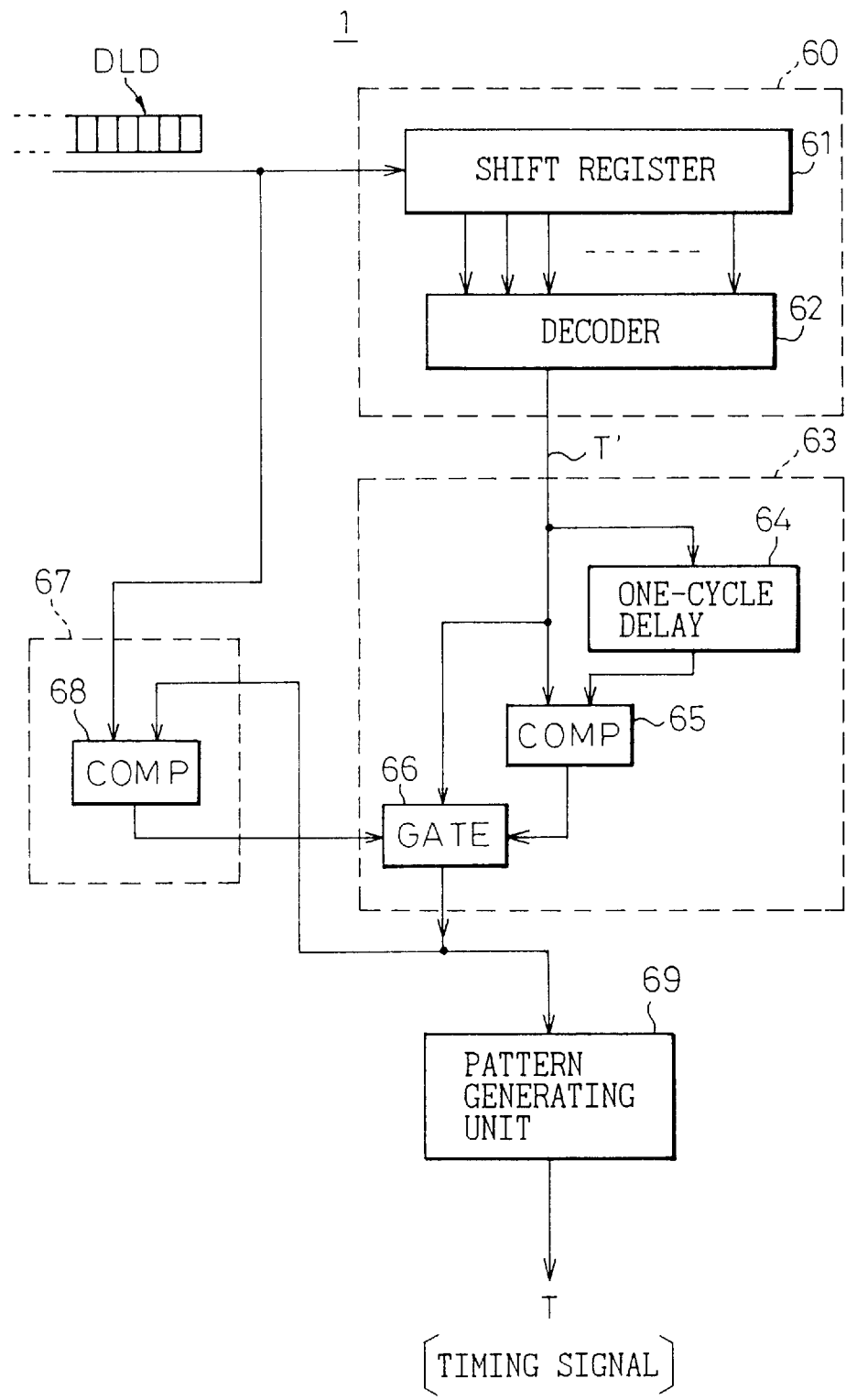
FIG. 4 is a view of a concrete example of a data-link synchronizing unit.

FIG. 4 is a view of a concrete example of the data-link synchronizing unit. The data-link synchronizing unit 1 receives the data-link data DLD from the left top of the present figure and outputs the timing signal T (shown also on the left of FIG. 3C).

One series of data DLD are input to the synchronization detection unit 60, i.e., a so-called "hunting" unit, and the synchronization pattern in each frame is found here. The synchronization pattern of "1010 . . . " is shown as an example in FIG. 3E. For this reason, the data DLD is once stored in the shift register 61. Only a part of the specific bits among the stored data DLD is extracted and applied to the decoder 62. The decoder 62 outputs the timing signal T' when the pattern of "1010 . . . " is found. In order to determine whether or not this timing signal T' is a true timing signal T, that signal T' is input to the synchronization protecting unit 63.

The timing signal T' is given a delay of one cycle (amount of one multi-frame) at the one-cycle delay unit 64. The signal T' output from the decoder 62 and the signal T' from the one-cycle delay unit 64 are compared in the next cycle by a comparator 65. If the result of comparison is coincidence, it can be regarded that the timing signal T' is the true timing signal T, and therefore the gate 66 is opened and the timing signal T' is output from the gate 66.

Further, for performing the final confirmation, the data DLD on the left top is monitored at the point of time of generation of the timing signal T'. This monitoring is carried out by a comparator 68 which holds the pattern of "1010 . . . " by itself. If the result of comparison of the pattern of "1010 . . . " and the synchronization pattern of DLD is non-coincidence, the gate 66 is closed. This comparator 68 constitutes a so-called "OOF" detecting unit 67. "OOF" means "Out Of Frame".

The timing signal T' from the thus opened gate 66 is reliable as the true timing signal T, drives a pattern generating unit 69, and outputs the timing signal T. A cancellation is sometimes generated in the timing signal output as the true timing signal T from the gate 66 due to noise or the like, therefore a correct timing signal T is regenerated at the pattern generating unit 69.

Figure 5:
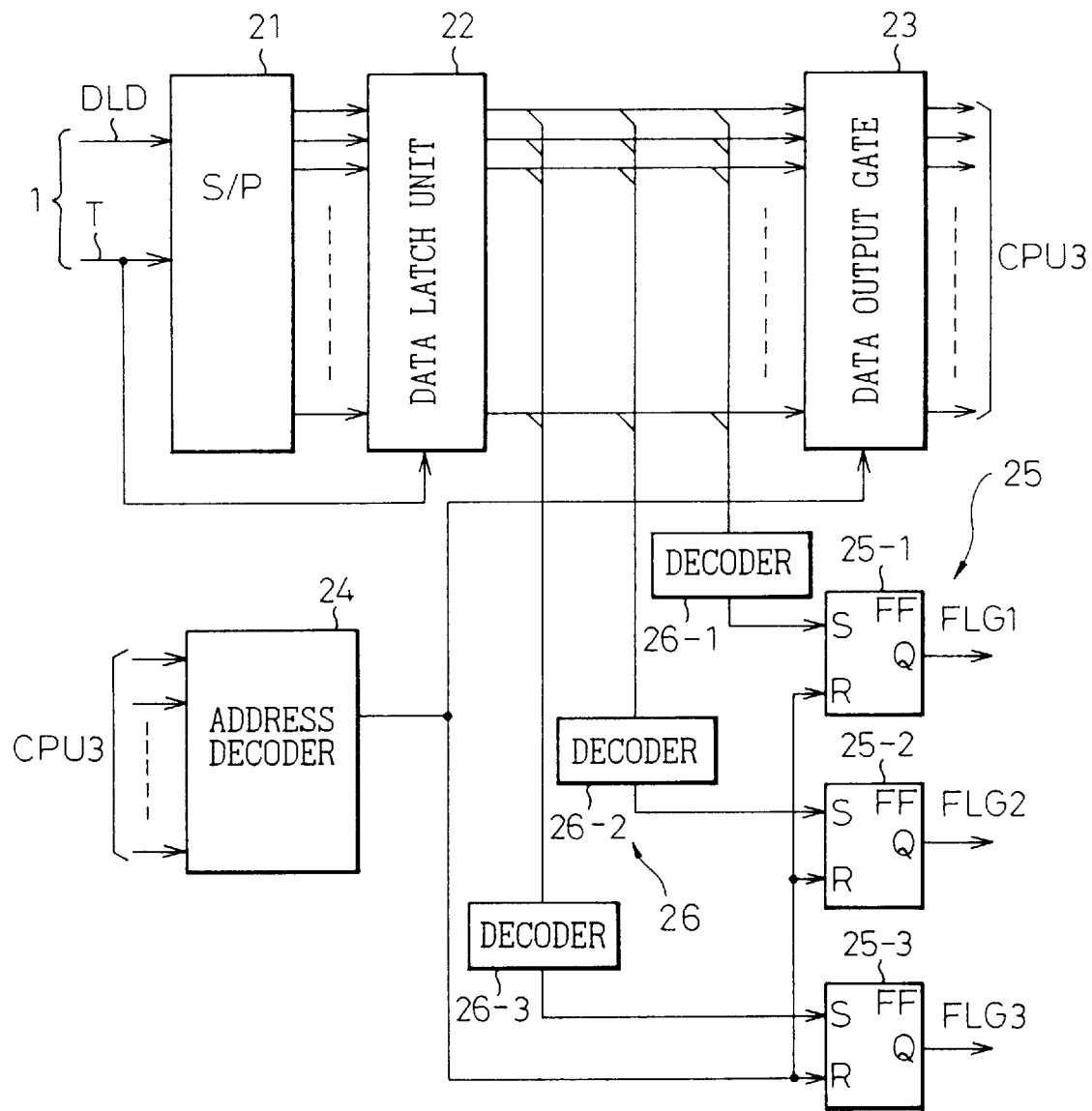
FIG. 5 is an explanatory view of the data-link interface device of a second embodiment of the present invention.

FIG. 5 is an explanatory view of the data-link interface device of a second embodiment of the present invention, in which the same symbols as those of FIG. 2 indicate the same parts, 25-1 to 25-3 are flip-flops, 26-1 to 26-3 are decoders, and FLG1 to FLG3 are data update flags of the data-link data.

These data update flags FLG1 to FLG3 are set so that the interrupt levels to the processor CPU are different from each other. For example, the flip-flop 25-1 is set when the alarm information is decoded by the decoder 26-1, and the interrupt level by the data update flag FLG1 in that case is set to be the highest, thereby to make the processor CPU quickly read and process the data-link data. Further, for example when the maintenance information etc. are decoded by the decoder 26-3, the flip-flop 25-3 is set, and the interrupt level by the data update flag FLG3 in that case is made lower than the interrupt level mentioned before, whereby the processor CPU can read and process the data-link data during the idling time of the processor CPU.

Further, for example, when various information other than the alarm information and the maintenance information are decoded by the decoder 26-2, the flip-flop 25-2 is set, and the interrupt level by the data update flag FLG2 in that case is made middle of the above-mentioned two interrupt levels, whereby the processor CPU can read and process the data-link data during the appropriate processing time of the processor CPU. In this case, if the positions of the bits of the various information latched in the data latch unit 22 is fixed, the decoders are connected in correspondence with the above bit positions, and when a meaning information is latched, the flip-flop (25) is set, and the data update flag can be applied to the processor CPU as the interrupt signal. Further, it is also possible to provide a further larger number of decoders and flip-flops in correspondence with each sort of information. This example is shown in FIG. 6.

Figure 6:
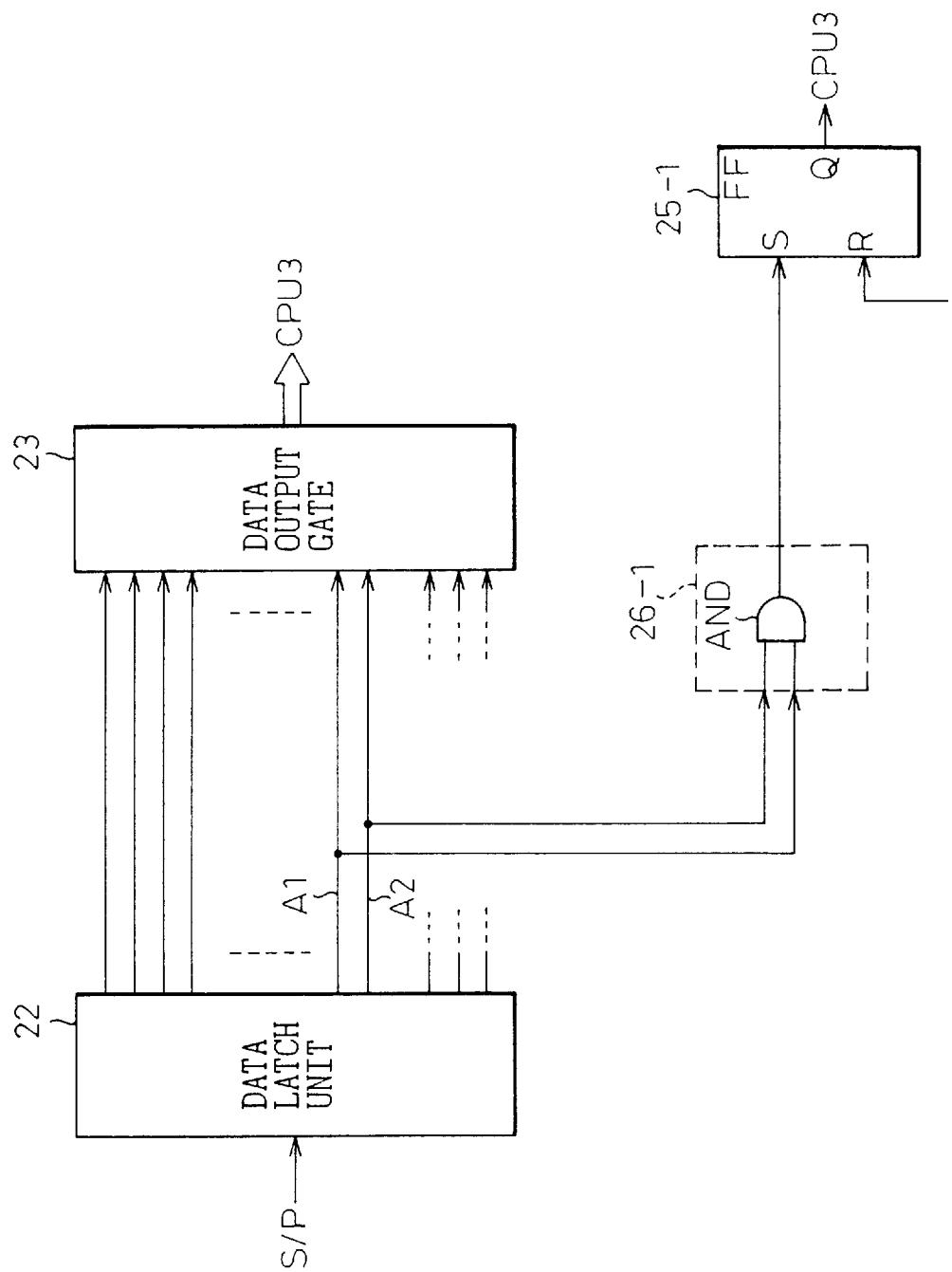
FIG. 6 is a view of a modification of one part of the circuit of FIG. 5.

FIG. 6 is a view of a modification of part in the circuit of FIG. 5 and particularly shows the decoder 26-1 in detail. When it is assumed that the decoder 26-1 monitors only the alarm information (A1, A2), the lines corresponding to A1 and A2 among the output data buses from the data latch unit 22 are connected to the input of the decoder 26-1.

When assuming that the alarm information (A1, A2) having a logic (1, 1) indicates that an alarm exists, the decoder 26-1 can be constituted by an AND gate as illustrated. The decoder 26-1 sets the flip-flop 25-1 if there is the alarm (1, 1) and transmits the interrupt flag to the CPU.

Figure 7:
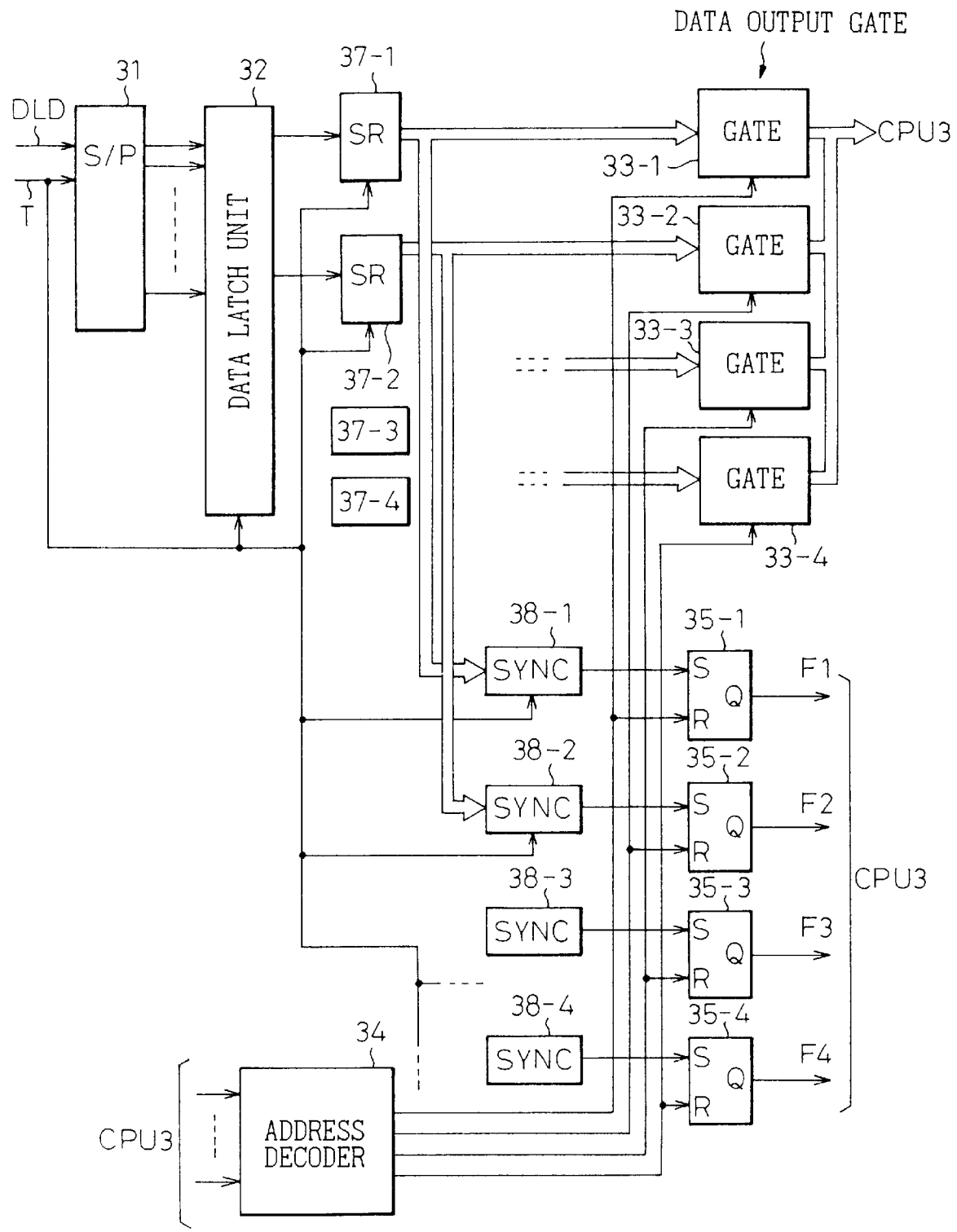
FIG. 7 is an explanatory view of the data-link interface device of a third embodiment of the present invention.

FIG. 7 is an explanatory view of a data-link interface device of a third embodiment of the present invention. In the present figure, 31 is a serial/parallel conversion unit (S/P), 32 a data latch unit, 33-1 to 33-4 are data output gates, and 35-1 to 35-4 are flip-flops. Further, 37-1 to 37-4 are shift registers, and 38-1 to 38-4 are synchronization detecting units. Further, DLD denotes a data-link data, T a timing signal, CPU a processor (3), and F1 to F4 denote data update flags of the data-link data.

When viewing the data field in the format of the data-link data, for information to which a desired bit number is allocated, the processor CPU can be interrupted at every cycle by a flag indicating that the data-link data is updated. When the processor CPU performs the reading, it is possible to reset the flip-flop, which indicates that the reading of the latched data is completed.

However, where the number of the allocated bits to certain information is small and a desired content is transmitted with a plurality of cycles, even if the processor CPU reads the data-link data at every cycle, the processor CPU cannot process that information. Therefore, where whether or not information having different updating cycles of the data-link data are latched in the data latch unit 32, is discriminated by the shift registers 37-1 to 37-4 and the synchronization detecting units 38-1 to 38-4 and the related data-link data are latched, the corresponding one flip-flop (35-1 to 35-4) is set by the detection output signal from the synchronization detecting unit (either of 38-1 to 38-4), and the corresponding data update flag (F1 to F4) is output.

Explaining this in a little more detail, when the data-link data DLD and the timing signal T are input to the serial/parallel conversion unit (S/P) 31, that data DLD is fetched into the data latch unit 32 and latched. The bit groups allocated to respective sets of the data DLD fetched into the data latch unit 32 is stored in corresponding shift registers 37-1 to 37-4. These bit groups are bits stored every time the timing signal T is generated and represent the data-link data of superframe.

On the other hand, the successively appearing timing signals T are input to also the synchronization detecting units 38-1 to 38-4, and these synchronization detecting units set the corresponding flip-flops 35-1 to 35-4 when the bit groups of the predetermined bit number are accumulated in respective shift registers 37-1 to 37-4 and the data update flags F1 to F4 are output to the CPU 3. Upon receipt of these, the CPU opens the corresponding data output gates 33-1 to 33-4 via the address decoder 34, and the data-link data of the superframe stored in the corresponding shift registers 37-1 to 37-4 are transmitted to the CPU.

Figure 8:
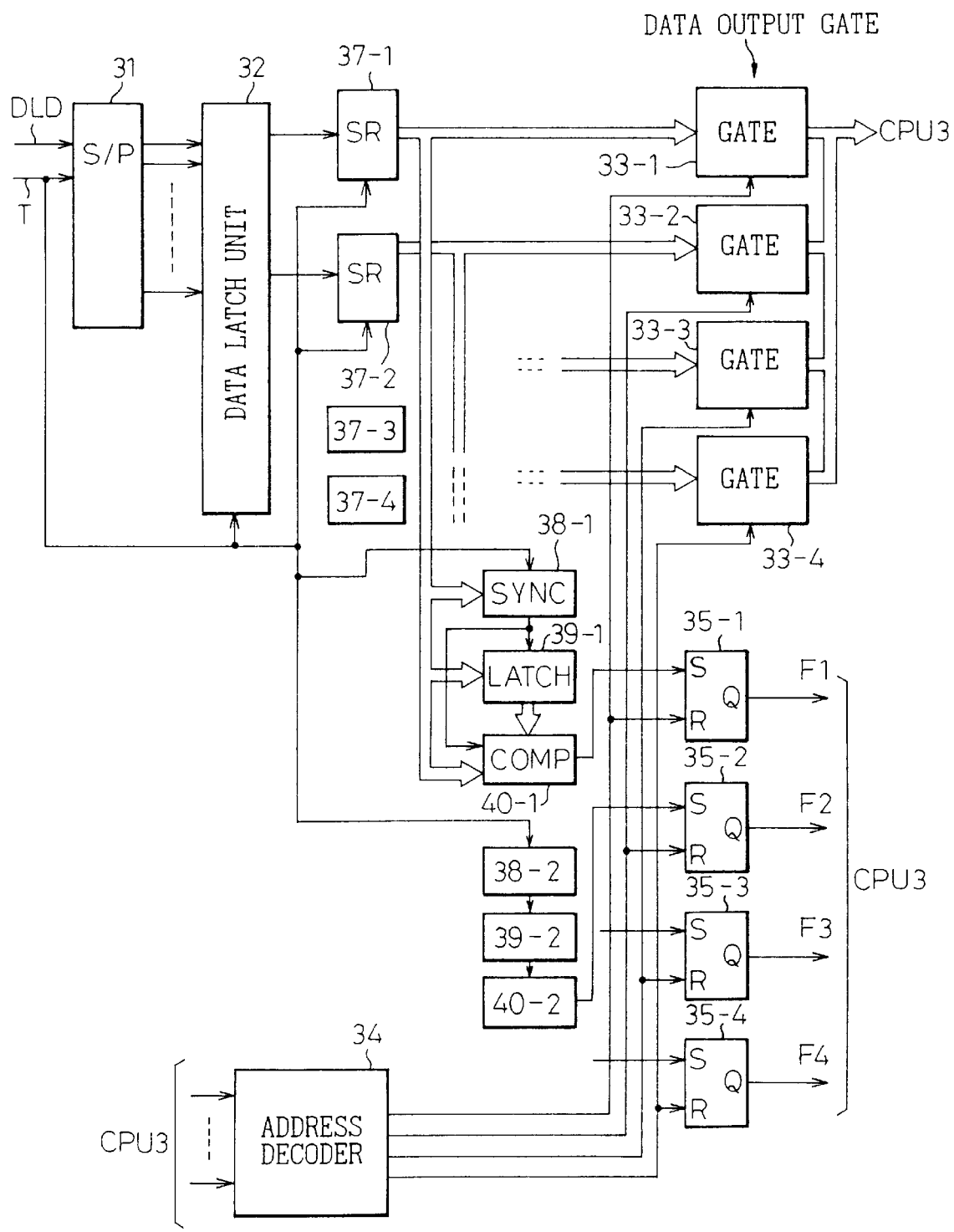
FIG. 8 is a view of a modification of the third embodiment of the present invention.

FIG. 8 is a view of a modification of the third embodiment of the present invention. It is different from the structure of FIG. 7 in that a data latch unit (39) and a data comparing unit (40) are further added to each synchronization detecting unit (38). Note that, in FIG. 8, only one set comprising the synchronization detecting unit 38-1, the data latch unit 39-1, and the data comparing unit 40-1 is shown as a representative example. The description will be omitted for the remaining three sets.

In this modification shown in FIG. 8, only when the content of the data-link data DLD (bit groups in the shift registers mentioned above) changes, the data update flag (F1 to F4) of the changed bit group is output from the corresponding flip-flop (35-1 to 35-4). By this, the frequency of interruptions to the CPU is decreased, and the load of the processing of the CPU can be reduced.

Referring to FIG. 8, at every timing at which the bit group (data-link data DLD) of the predetermined bit number extracted from the superframe at the synchronization detecting unit 38-1 is accumulated in the shift register 37-1, the bit group at that time is latched in the data latch unit 39-1. At the timing of the next superframe, the bit group stored in the data latch unit 39-1 and the bit group read and fetched, at present, from the shift register 37-1 are compared at the data comparing unit 40-1. Only when the result of this comparison is that the above two bit groups do not coincide, the data comparing unit 40-1 sets the corresponding flip-flop 35-1 and make this flip-flop output the data update flag F1.

In FIG. 8, assuming that the first synchronization detecting unit 38-1 detects the latch of the information where the updating cycle is 1, the second synchronization detecting unit (38-2) detects the latch of the information where the updating cycle is 2, the third synchronization detecting unit (38-3) detects the latch of the information where the updating cycle is 3, and the fourth synchronization detecting unit (38-4) detects the latch of the information where the updating cycle is 4, the flip-flop 35-1 is set for every cycle by the detecting unit 38-1 and will transmit the data update flag F1. Then, when the processor CPU transmits the address signal where the data-link data corresponding to the data update flag F1 is read, the data output gate 33-1 is opened by the output signal obtained by decoding this address signal by the address decoder 34, the information of one updating cycle stored in the shift register 37-1 is transmitted to the processor CPU, and the flip-flop 35-1 is reset.

Further, this means that the flip-flop 35-2 is set at every two cycles by the second synchronization detecting unit (36-2), and when the address signal where the processor CPU reads the data-link data corresponding to the data update flag F2 is decoded by the address decoder 34, the data output gate 33-2 is opened, and the information of two updating cycles stored in the shift register 37-2 is transmitted to the processor CPU and the flip-flop 35-2 is reset.

Similarly, the flip-flops 35-3 and 35-4 are set by the synchronization detecting units (36-3 and 36-4) at every three and four cycles respectively. When the processor CPU outputs the address signals for reading the data-link data corresponding to the data update flags F3 and F4 respectively, the address signals are decoded by the address decoder 34, the data output gates 33-3 and 33-4 are opened by the output signal from the decoder 34, so that the information of the three and four updating cycles latched in the shift registers (37-3, 37-4) is respectively output, and the flip-flops 35-3 and 35-4 are reset.

The present invention is not limited to only the above embodiments. Various additions and modifications can be made. It is possible for example to apply the digital transmission lines 5-1 to 5-m to not only the DS1 signals, but also for example DS3 (44.736 Mbps) signals, etc. It is also possible to arrange various logical processing units (FIG. 9) between the data latch unit and the data output gate, produce the data update flag corresponding to the contents of the latched data-link data, and perform the interruption to the processor 3.

Figure 9:
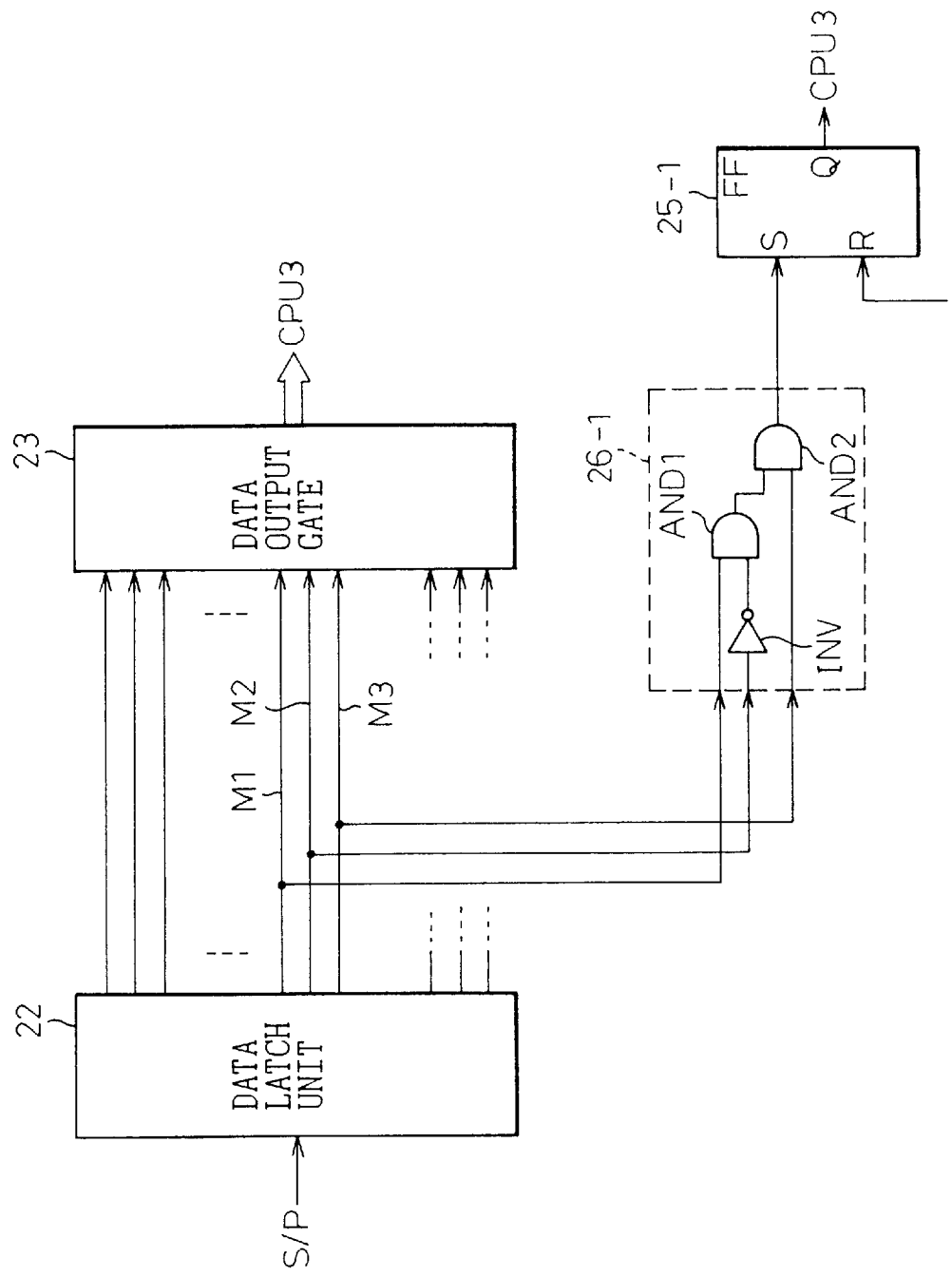
FIG. 9 is a view of an example of an interrupt circuit for a processor.

FIG. 9 is a view of an example of the interrupt circuit to the processor and is one example of the above-mentioned various logical processing units. Note that, the structure of FIG. 9 corresponds to the structure of FIG. 6 and deals with the subscriber line maintenance information [M1, M2, M3] shown in FIGS. 3C and 3F. In the example of the present figure, [M1, M2, M3] are set to [1, 0, 1], and the decoder 26-1 comprises an inverter INV and AND gates AND1 and AND2.

As explained above, the data-link processing equipment 10 of the present invention has data-link synchronizing units 1-1 to 1-m which receive as their inputs the data-link data demultiplexed by establishing the frame synchronization by the frame synchronizing units 6-1 to 6-m corresponding to the digital transmission lines 5-1 to 5-m and establish the synchronization; a data-link interface device 2 which latches the data-link data and uses the data update flag as the interrupt signal; and a processor 3 for processing the data-link data without causing a processing delay produced by establishing the phase synchronization among a plurality of transmission lines 5-1 to 5-m. Thus the data-link data corresponding to the transmission lines 5-1 to 5-m can be processed by the processor 3.

Further, the data update flag indicating that the data-link data are latched in the data-link interface device 2 is produced, the interruption is applied to the processor 3, and when the processor 3 reads the data-link data, the data update flag is cleared, whereby the erroneous double reading of the same data-link data can be reliably prevented. Further, even in a case where the number of the accommodated subscribers is small and also the number of the transmission lines to be used is small, and even in a case where the number of the transmission lines to be used is increased by an increase of the number of the accommodated subscribers, the data-link processing equipment 10 uses the data update flag for the transmission lines which are busy and the processor 3 reads and processes the data-link data, and therefore a particular setup operation for coping with the increase or decrease of the number of the transmission lines is not required.

Further, the data update flags having interrupt levels different from each other are produced by logical processing such as the decoding of the data-link data latched in the data latch unit 22 in the data-link interface device 2. Where it is urgent, information having a high interrupt level can be processed by the processor 3 with a higher priority. Further, due to the small number of the allocated bits, where the information contained in the data-link data is updated with a plurality of cycles, the data update flag for the processor 3 can be produced by using the shift register corresponding to each updating cycle and detecting that the information was updated according to the updating cycles by the synchronization detecting unit, etc. Accordingly, the processor 3 can read and process the data when the flag is produced without considering the updating cycles, therefore the processing load of the processor can be reduced.

Further, the apparatus for a subscriber terminal office of the present invention provides the above-mentioned data-link processing equipment 10 to adjust the data from the transmission lines 5-1 to 5-m to the same phase by the phase adjusting unit 7, and performs the cross-connection by the subscriber data cross-connect unit 8, therefore this subscriber data cross-connect unit 8 and the data-link processing equipment 10 can be commonly used. For this reason, there is an advantage that the control of the cross-connect can be performed with a good efficiency irrespective of whether the number of the subscribers to be accommodated and the number of the transmission lines to be used is large or small.

What is claimed is:

1. Data-link processing equipment provided with:

data-link synchronizing units, for respective digital transmission lines, which receive as their inputs data-link data extracted from the digital transmission lines and establish synchronization;

a data-link interface device which latches the data-link data synchronized by these data-link synchronizing units and outputs a data update flag; and a processor which starts processing by using said data update flag as an interrupt signal and reads and processes the data-link data latched in said data-link interface device by this interrupt signal.

2. A data-link processing equipment according to claim 1, wherein said data-link interface device is provided with a serial/parallel conversion unit which converts each data-link data from said data-link synchronizing unit to parallel data; a data latch unit which latches each parallel data converted by the serial/parallel conversion unit; a data output gate which outputs the data latched in the data latch unit; a flip-flop which outputs a data update flag indicating that the data is latched in said data latch unit; and an address decoder which decodes the address signal from said processor for reading the data latched in said data latch unit, controls said data output gate, and resets said flip-flop.

3. A data-link processing equipment according to claim 1, wherein provision is made of a data decoder which logically processes the data latched in said data latch unit and a plurality of flip-flops which produce the data update flags having different interrupt levels by the result of the logical processing.

4. A data-link processing equipment according to claim 2, wherein provision is made of a data decoder which logically processes the data latched in said data latch unit and a plurality of flip-flops which produce the data update flags having different interrupt levels by the result of the logical processing.

5. A data-link processing equipment according to claim 1, wherein it includes:

synchronization detecting units which detect that a predetermined number of predetermined synchronization data are latched in correspondence with each of the information which are latched in said data latch unit and have plural types of updating cycles and shift registers which collect said information from said data latch unit by said predetermined cycle and store the same.

6. A data-link processing equipment according to claim 2, wherein it includes synchronization detecting units which detect that a predetermined number of sets of data having predetermined cycles are latched in correspondence with respective sets of information which are latched in said data latch unit and have plural types of updating cycles and shift registers which collect by said predetermined cycles each information from said data latch unit and store the same.

7. A data-link processing equipment according to claim 5, wherein said data update flag is generated only when there is a change between said information latched with a certain updating cycle and said information latched with the next updating cycle.

8. A data-link processing equipment according to claim 6, wherein said data update flag is generated only when there is a change between said information latched with a certain updating cycle and said information latched with the next updating cycle.

9. An apparatus for a subscriber terminal office provided with frame synchronizing units for respective digital transmission lines;

a phase adjusting unit which receives as its input subscriber data for which the frame synchronization is established by the frame synchronizing units and adjusts the phases to be the same as each other;

a subscriber data cross-connect unit which receives as its input each subscriber data with the phases adjusted to be the same by the phase adjusting unit and performs a cross-connection;

a demultiplexer units which demultiplex the multiplexed signal from the subscriber data cross-connect unit and input the demultiplexed signals to respective channel units in the subscriber interface blocks; and data-link processing equipment which receives as its input the data-link data demultiplexed by said frame synchronizing units and processes the same to control said subscriber data cross-connect unit.

10. An apparatus for a subscriber terminal office according to claim 9, wherein the data-link processing equipment provides data-link synchronizing units which establish the data-link synchronization for the data-link data demultiplexed by said frame synchronizing units; a data-link interface device which latches the data-link data synchronized by the data-link synchronizing units and produces a data update flag; and a processor which reads and processes said latched data-link data by using said data update flag as an interrupt signal.

* * * * *